United States Patent
Skene

(10) Patent No.: US 7,928,660 B2
(45) Date of Patent: Apr. 19, 2011

(54) VEHICULAR CONSPICUITY LAMP WITH RAPIDLY MODULATED INTENSITY

(75) Inventor: Jeremy F. Skene, Oak Hill, VA (US)

(73) Assignee: Jeremy F. Skene, Herndon, VA (US)

(*) Notice: Subject to any disclaimer, the term of this patent is extended or adjusted under 35 U.S.C. 154(b) by 200 days.

(21) Appl. No.: 12/131,001

(22) Filed: May 30, 2008

(65) Prior Publication Data

US 2009/0295294 A1   Dec. 3, 2009

(51) Int. Cl.
*B60Q 1/14*   (2006.01)
(52) U.S. Cl. ............................ 315/77; 315/82; 315/291
(58) Field of Classification Search .................. 315/77, 315/82, 247, 291, 294, 297; 307/10.1, 10.8; 323/282, 283
See application file for complete search history.

(56) References Cited

U.S. PATENT DOCUMENTS

| 4,578,591 | A | * | 3/1986 | Floyd et al. | 307/10.1 |
| 4,841,198 | A | * | 6/1989 | Wilhelm | 315/82 |
| 5,001,398 | A | * | 3/1991 | Dunn | 315/77 |
| 5,334,914 | A | * | 8/1994 | Dean et al. | 315/291 |
| 6,369,513 | B1 | * | 4/2002 | Kanazawa | 315/82 |
| 2003/0107357 | A1 | * | 6/2003 | Uchikura et al. | 323/282 |
| 2005/0258781 | A1 | * | 11/2005 | Funae et al. | 315/291 |
| 2008/0122607 | A1 | * | 5/2008 | Bradley | 340/468 |

* cited by examiner

*Primary Examiner* — Douglas W Owens
*Assistant Examiner* — Tung X Le
(74) *Attorney, Agent, or Firm* — Miles & Stockbridge P.C.; Michael A. Minter

(57) ABSTRACT

A method and apparatus is used to rapidly modulate the intensity of a vehicular lamp for the purpose of enhancing the vehicle's conspicuity. A timer is used to generate a periodically varying pulse width modulated signal that is used to drive a transistor connected to one or more lamps. The modulation rate is chosen such that the lamp or lamps appear to flicker when seen with peripheral vision, yet appears not to flicker when seen out of the center of the eye.

20 Claims, 3 Drawing Sheets

VEHICULAR CONSPICUITY LAMP WITH RAPIDLY MODULATED INTENSITY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM, LISTING COMPACT DISC APPENDIX

Not Applicable

BACKGROUND OF THE INVENTION

This invention relates to the need for increased conspicuity in moving vehicles in order to reduce the likelihood of accidents.

A significant percentage of traffic accidents is caused by the driver failing to see the other vehicle. This is particularly true in situations where a vehicle must be detected using peripheral as opposed to central vision, for example, when a driver's attention is directed away from the roadway directly ahead of his vehicle. There is good reason to believe that late detection on the part of the driver is a major factor in these collisions.

One way to reduce the likelihood of late detection is to increase vehicle conspicuity. To this end, daytime running lights have been introduced, as have white strobe lights on school buses. Motorcycles, particularly vulnerable due to their small size, are mandated to use their headlight at all times in order to increase their conspicuity. To further increase motorcycle conspicuity, a federal regulation (49 CFR 571.108-S7.9.4) allows motorcycles to use a modulated headlight, in which the intensity of the headlight fluctuates between maximum intensity and 17% of this value 4 to 5 times per second.

Studies have shown that a rapid flickering lamp captures the attention more than does a steadily burning lamp. It is also the case that human sensitivity to flicker increases as the lamp is viewed on the peripheral of the retina rather than on the fovea (center of the eye). The modulation rate of the present invention is chosen to exploit this difference in persistence rate, such that the lamp appears to flicker, and so is more conspicuous, when viewed off axis from the center of the eye, yet appears to be steady-burning when viewed straight on.

Improvements in the intensity, cost and power consumption of light emitting diodes and gas discharge lamps have made it feasible to use these devices on vehicles. Unlike incandescent bulbs, these new type of lamps have very rapid ON-OFF times. This rapid intensity control capability lends them well to their use as a high-conspicuity, rapidly modulated conspicuity lamp for vehicular use.

Other inventions exist that perform the function of increasing conspicuity but in a different way than the present invention. These include:
U.S. Pat. No. 3,693,151 issued to Tatsuo Hasegawa on Sep. 19, 1972;
U.S. Pat. No. 4,309,639 issued to Herbert Thrower on Jan. 5, 1982;
U.S. Pat. No. 5,345,218 issued to Daniel S. Woods on Sep. 6, 1994;
U.S. Pat. No. 5,499,010 issued to Theodore E. Cohn on Mar. 12, 1996;
U.S. Pat. No. 5,856,779 issued to Leon L. Friday on Jan. 5, 1999;
U.S. Pat. No. 6,744,361 issued to Harold Maddox on Jun. 1, 2004;
U.S. Pat. No. 6,837,603 issued to Sergiy Komarynsky on Jan. 4, 2005;

Although the devices and apparatus of the prior art deserve undeniable merits, it is believed that these prior inventions do not operate in the same manner or with the same design as the present invention.

BRIEF SUMMARY OF THE INVENTION

The present invention is designed to improve the conspicuity of vehicles, and thus minimize the likelihood of accidents. It involves modulating the intensity of a conspicuity lamp that is attached to the front, sides and/or rear of the vehicle. The modulation rate is selected such that the lamp or lamps appear much more noticeable than a steadily burning lamp.

While modulated and flashing lamps have been developed in the past, as referenced in the background section above, e present invention exploits the natural characteristic of the human eye's persistence of vision. The modulation rate is chosen to be in the range of 40-60 Hz, such that the lamp appears to be flickering when viewed in the peripheral vision of an observer, but does not appear to flicker when viewed straight on. This modulation rate thus does not make the lamp objectionable to those drivers directly preceding or following the vehicle using such a lamp, while it is quite noticeable when viewed off the central axis of the eye.

DETAILED DESCRIPTION OF THE INVENTION

A method is provided for rapidly modulating the intensity of a conspicuity lamp located on the front, rear or sides of a vehicle. This intensity modulation is done in order to enhance the conspicuity of the vehicle to other vehicles around it, as a lamp with rapidly fluctuating intensity is more easily noticed than is a steadily illuminated one.

The method of modulating the lamp consists of utilizing a lamp consisting of at least one light emitting element, whose intensity can be rapidly varied, such as a light emitting diode or a gas discharge lamp, and modulating the power provided to the lamp at an appropriate rate.

Figure 1:
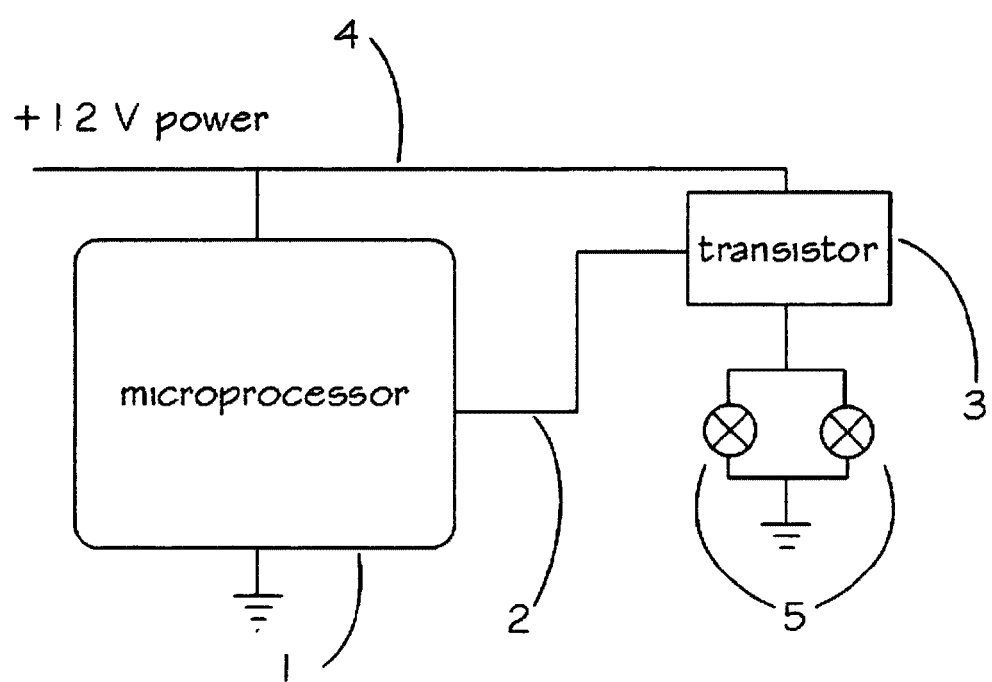
FIG. 1 is a schematic illustrating the manner by which the lamp's intensity is modulated.

The means of modulating the power to the lamp, as illustrated in FIG. 1, is as follows:

A timer 1 generates a control signal 2 that is connected to the base of a transistor 3. The transistor is wired in a manner to switch the voltage provided by the +12 volt source voltage 4, on and off. The output of the transistor is connected to the lamp or lamps 5.

Figure 2:
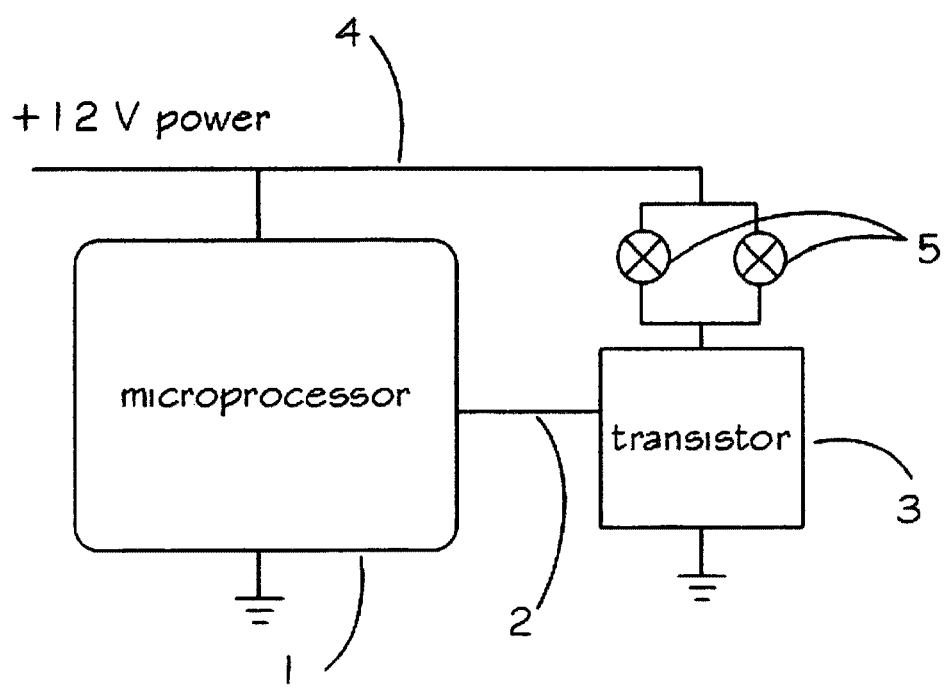
FIG. 2 is a schematic illustrating al alternative manner by which the lamp's intensity may be modulated.

An alternative design is illustrated in FIG. 2. This operates in essentially the same manner, except that the transistor is connected between the lamp and ground.

In each of these designs, the control signal 2 is pulse width modulated with a duty cycle that alternates between 100% and a lower percentage duty cycle. This control signal is illustrated in FIG. 3.

Figure 3:
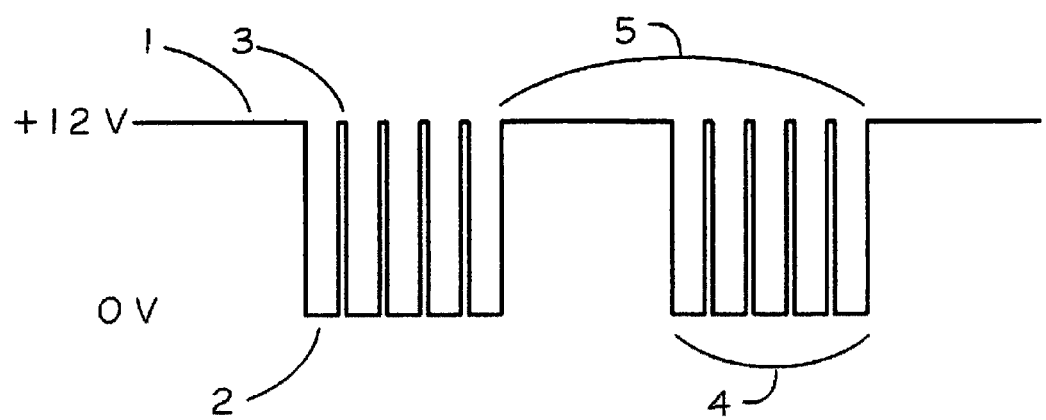
FIG. 3 illustrates the pulse width modulated waveform used to modulate the lamp's intensity. It shows the maximum ON duty cycle of 100% and a lower duty cycle that reduces the lamp's intensity.

With reference to FIG. 3, during time period 1 full power is sent to the lamp, turning it fully on. This represents a 100% duty cycle. At the end of time period 1 the voltage is reduced to 0 volts for time period 2, and the lamp is off. At the end of time period 2 the power is turned back on for a time period 3. This lower percentage duty cycle period persists for time period 4, after which the power is once again switched back on for time period 1, and the cycle repeats indefinitely. The period of each cycle is defined by time period 5. At the lower percentage duty cycle the lamp is less bright. The lower percentage duty cycle is selected based upon the type of lamp used, and is chosen such that it provides a clear difference in lamp output of the lamp between the 100%, fully on mode and the less bright mode. This duty cycle may be as low as 0%.

In this way, the timer switches the light output of the lamp from bright to less bright and back again. The modulation rate between the 100% duty cycle and the lower percentage duty cycle is selected to be between 40 Hz and 60 Hz in order that the modulated, variable intensity of the lamp is just noticeable to the human eye, without appearing as a distinctly flashing lamp.

In this manner, a vehicle equipped with this type of lamp will be more noticeable to surrounding vehicles than it would be with a normal, steady burning lamp.

What is claimed is:

1. A method of increasing conspicuity of a vehicle to an observer, comprising:
    attaching a lamp to one or more of the front, sides and rear of the vehicle, the lamp including an electric power source, a timer connected to the electric power source, a transistor connected to and driven by the timer, and one or more light emitting elements connected to the transistor; and
    modulating intensity of light emitted from the lamp in accordance with a difference between a persistence rate of peripheral vision of the observer and a persistence rate of foveal vision of the observer such that light from the lamp appears to be flickering when viewed in the peripheral vision of the observer and appears to be steadily illuminated when viewed in the foveal vision of the observer, thereby making the lamp and vehicle more conspicuous to the observer, while presenting the observer with an apparently steady light when the lamp and vehicle are viewed straight on.

2. The method of claim 1, wherein the modulating intensity of light emitted from the lamp includes generating in the timer a pulse width modulated signal that switches between a 100% duty cycle and a lower percentage duty cycle, such that the intensity of light emitted from the lamp is variable from brightest at the 100% duty cycle to relatively less bright at the lower percentage duty cycle.

3. The method of claim 2, wherein the lower percentage duty cycle is selected based upon the type of light emitting element included with the lamp and is selected such that the modulating provides a substantial difference in perceived light intensity between the 100% duty cycle and the lower percentage duty cycle.

4. The method of claim 3, wherein a modulation rate between the 100% duty cycle and the lower percentage duty cycle is selected such that the modulated, variable intensity of light emitted from the lamp is conspicuous to the observer without appearing as a distinctly flashing lamp.

5. The method of claim 4, wherein the modulation rate is in the range of 40-60 Hz.

6. The method of claim 1, wherein the light emitting elements include one or more of light emitting diodes and gas discharge lamps.

7. The method of claim 1, wherein the persistence rate of peripheral vision and the persistence rate of foveal vision correspond, respectively, to a critical fusion frequency of peripheral vision and a critical fusion frequency of foveal vision.

8. A conspicuity lamp for a vehicle, comprising:
    an electric power source;
    a timer connected to the electric power source;
    a transistor connected to and driven by the timer; and
    one or more light emitting elements connected to the transistor,
    wherein the lamp is configured to modulate intensity of light emitted from the lamp in accordance with a difference between a persistence rate of peripheral vision and a persistence rate of central vision of an observer such that light from the lamp appears to be flickering when the lamp is viewed peripherally and appears to be steadily illuminated when the lamp is viewed centrally.

9. The conspicuity lamp of claim 8, wherein the timer is configured to generate a pulse width modulated signal that switches between a 100% duty cycle and a lower percentage duty cycle, such that the intensity of light emitted from the lamp is variable from brightest at the 100% duty cycle to relatively less bright at the lower percentage duty cycle.

10. The conspicuity lamp of claim 9, wherein the lower percentage duty cycle is selected based upon the type of light emitting element included with the lamp and is selected such that the modulating provides a substantial difference in perceived light intensity between the 100% duty cycle and the lower percentage duty cycle.

11. The conspicuity lamp of claim 10, wherein a modulation rate between the 100% duty cycle and the lower percentage duty cycle is selected such that the modulated, variable intensity of light emitted from the lamp is more conspicuous to the observer without appearing as a distinctly flashing lamp.

12. The conspicuity lamp of claim 11, wherein the modulation rate is in the range of 40-60 Hz.

13. The conspicuity lamp of claim 8, wherein the transistor is connected directly to the electric power source, and the one or more light emitting elements are connected between the transistor and ground.

14. The conspicuity lamp of claim 8, wherein the one or more light emitting elements are connected directly to the electric power source and the transistor is connected between the one or more light emitting elements and ground.

15. The conspicuity lamp of claim 8, wherein the light emitting elements include one or more of light emitting diodes and gas discharge lamps.

16. The conspicuity lamp of claim 8, wherein the persistence rate of peripheral vision and the persistence rate of central vision correspond, respectively, to a critical fusion frequency of peripheral vision and a critical fusion frequency of central vision.

17. A vehicle comprising a conspicuity lamp, the conspicuity lamp including:
    an electric power source;

a timer connected to the electric power source;

a transistor connected to and driven by the timer; and one or more light emitting elements connected to the transistor, wherein the lamp is configured to modulate intensity of light emitted from the lamp in accordance with a difference between a persistence rate of peripheral vision and a persistence rate of foveal vision of an observer such that light from the lamp appears to be flickering when the lamp is viewed peripherally, while appearing to be steadily illuminated when the lamp is viewed foveally, thereby making the lamp and vehicle more conspicuous to the observer, while presenting the observer with an apparently steady-burning light when the lamp and vehicle are viewed from a perspective where the observer is directly preceding or following the vehicle.

18. The vehicle of claim 17, wherein the conspicuity lamp is attached to one or more of the front, sides and rear of the vehicle.

19. The vehicle of claim 17, wherein the light emitting elements include one or more of light emitting diodes and gas discharge lamps.

20. The vehicle of claim 17, wherein the persistence rate of peripheral vision and the persistence rate of foveal vision correspond, respectively, to a critical fusion frequency of peripheral vision and a critical fusion frequency of foveal vision.

* * * * *